United States Patent [19]

Schantz

[11] Patent Number: 5,124,720

[45] Date of Patent: Jun. 23, 1992

[54] FAULT-TOLERANT DOT-MATRIX PRINTING

[75] Inventor: Christopher A. Schantz, Redwood City, Calif.

[73] Assignee: Hewlett-Packard Company, Palo Alto, Calif.

[21] Appl. No.: 561,556

[22] Filed: Aug. 1, 1990

[51] Int. Cl.$^5$ .................... B41J 2/22; B41J 2/505
[52] U.S. Cl. ........................ 346/1.1; 346/140 R; 400/74; 400/124
[58] Field of Search ............ 346/140 R, 1.1, 76 PH; 400/74, 121, 124

[56] References Cited

U.S. PATENT DOCUMENTS 4,813,802  3/1989  Gilham et al. ............ 346/76 PH

FOREIGN PATENT DOCUMENTS 0059466  4/1984  Japan .................... 400/124
0201965  10/1985  Japan .................... 400/124
0067163  3/1988  Japan .................... 400/74

OTHER PUBLICATIONS

IBM Technical Disclosure Bulletin vol. 21 No. 2 Jul. 1978 entitled, "Degraded Printer Operation".

*Primary Examiner*—Benjamin R. Fuller
*Assistant Examiner*—Alrick Bobb

[57] ABSTRACT

The invention is fault-tolerant dot-matrix printing that substitutes a tested functioning printing element for a malfunctioning printing element. A detector, such as a piezoelectric membrane drop detector, tests the printing elements for malfunctioning printing elements. Once a malfunctioning printing element is detected, either a detector or a substitution algorithm identifies which section of the printing elements the malfunctioning printing element resides in. The printer controller chooses a defect-free section to substitute for the defective section containing the malfunctioning printing element, disconnects the section containing the malfunctioning printing element, reroutes print signals from the defective section containing the malfunctioning printing element to the substitute section, and alters the scan path of the printhead so that the substitute section prints for itself as well as for the defective section.

8 Claims, 4 Drawing Sheets

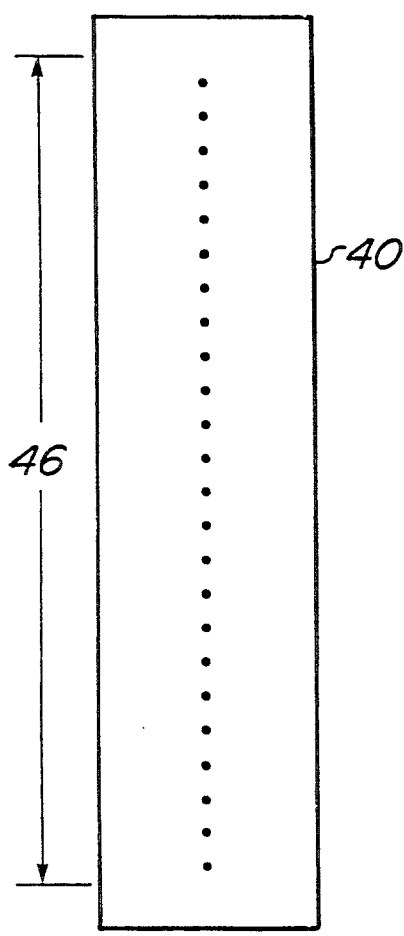
Figure 2a
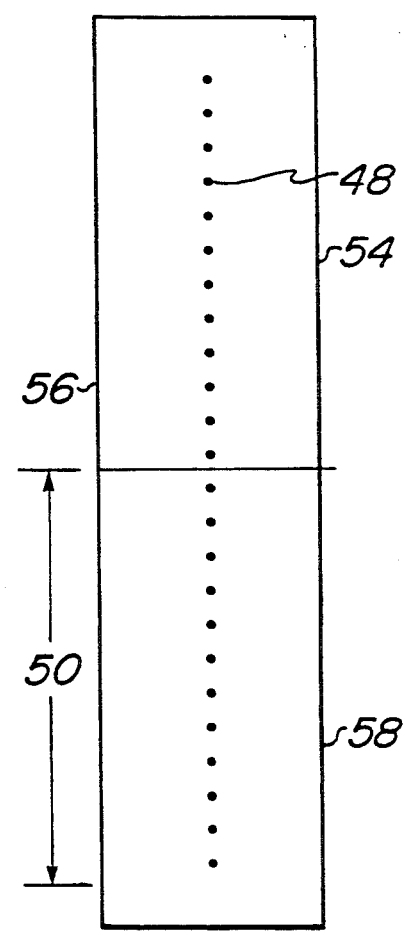
Figure 2c
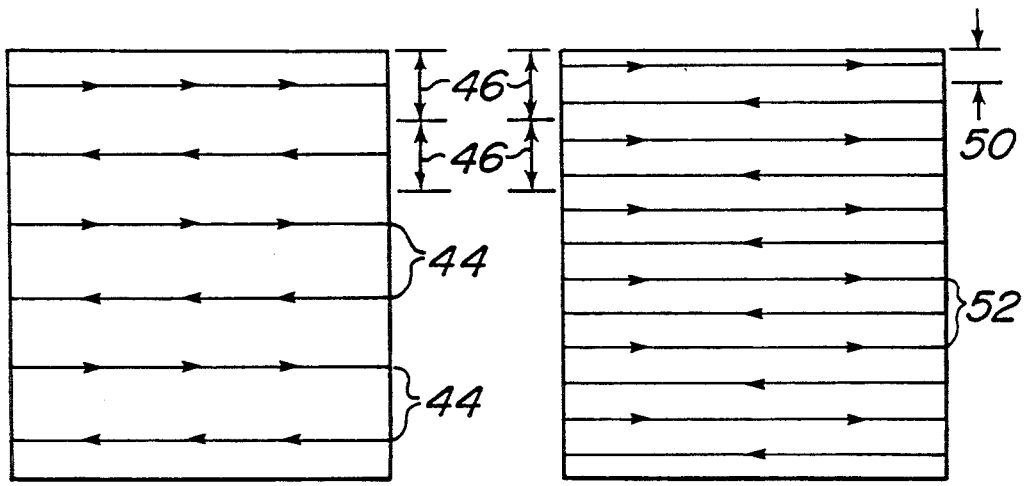
Figure 2b
Figure 2d

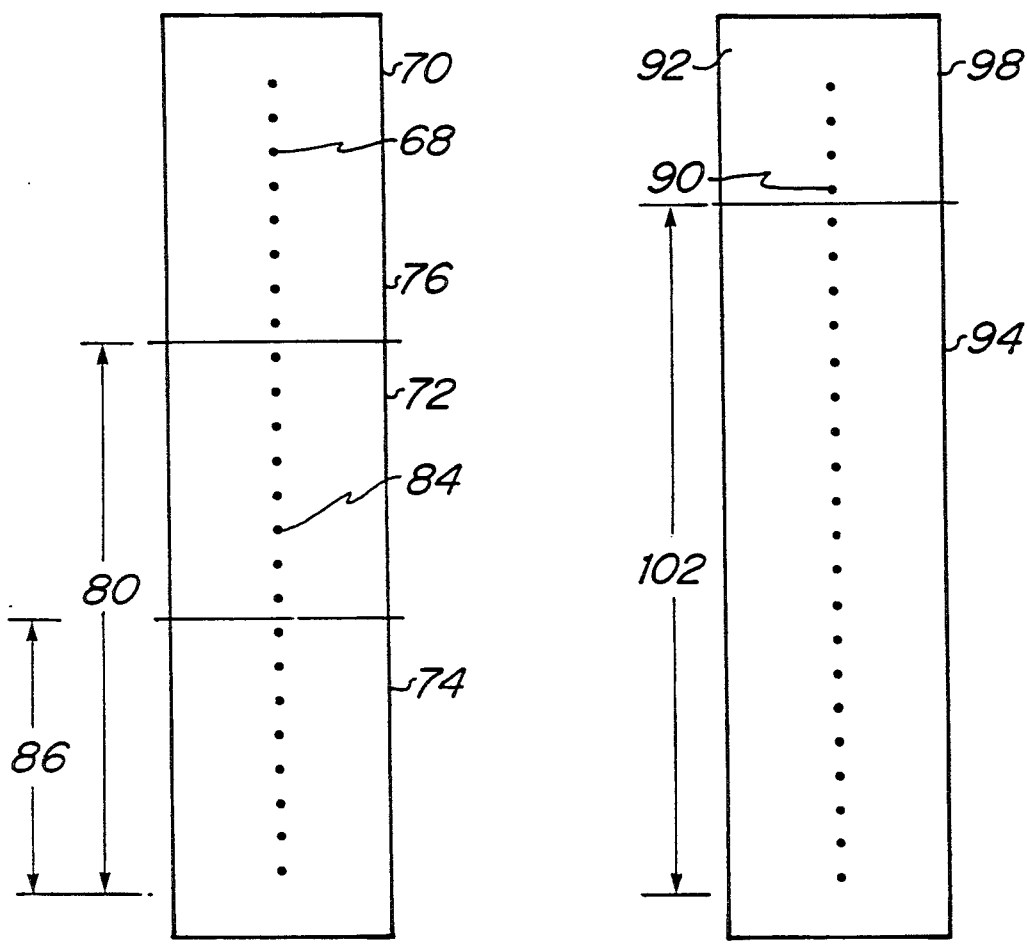
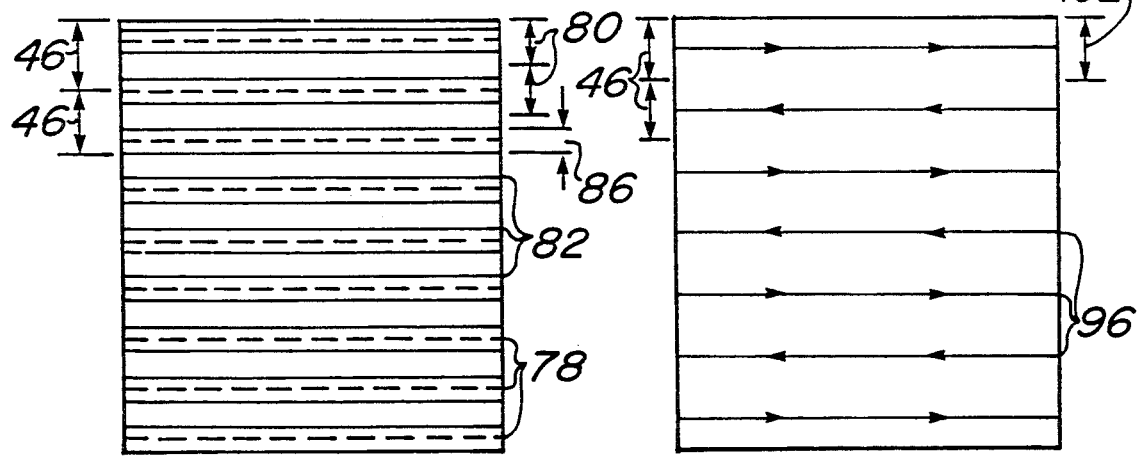

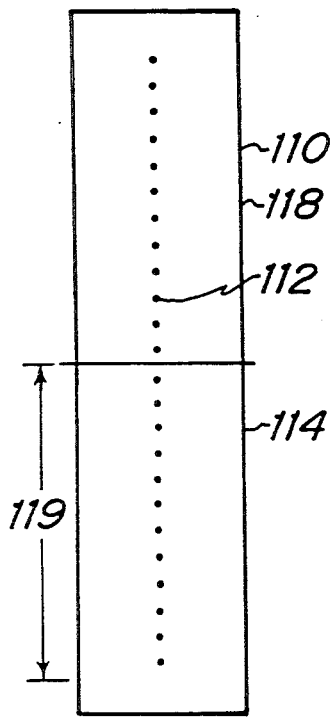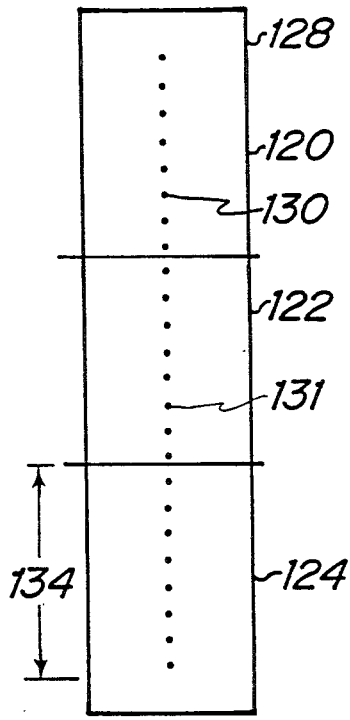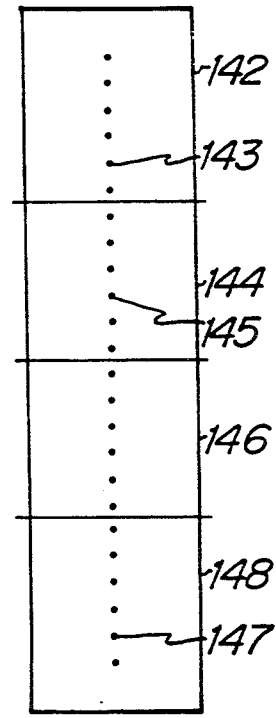
Figure 5a      Figure 5b      Figure 5c
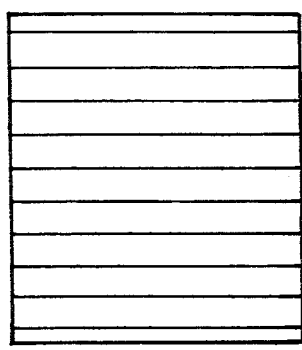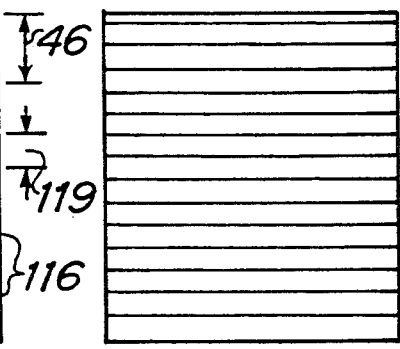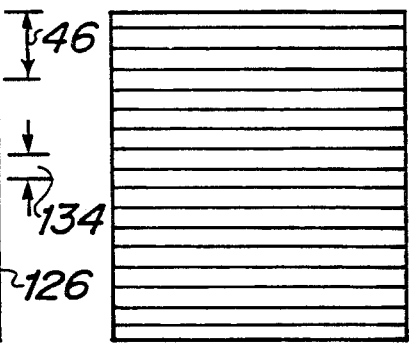
Figure 5d      Figure 5e      Figure 5f

FAULT-TOLERANT DOT-MATRIX PRINTING

FIELD OF THE INVENTION

This invention relates generally to dot-matrix printers which print text and graphics using multiple identical printing elements to print a multitude of closely-spaced, small dots. More specifically, the invention relates to thermal ink jet dot-matrix printers.

BACKGROUND OF THE INVENTION

Dot-matrix printheads have an array of printing elements that are selectively turned on and off by a printer controller to form printed shapes that are recognizable as characters. If one of the printing elements is inoperative, then the characters produced by the printhead will have a gap where the inoperative printing element would have produced a dot. If only one printing element is malfunctioning, the characters will appear deformed and unaesthetic. If several printing elements are malfunctioning, the print may be difficult to read. Unfortunately, printing elements can develop defects at any time without warning and the user must replace the malfunctioning printing elements immediately or accept inferior quality print.

Newer printheads for dot-matrix printers tend to have more printing elements so they can print at a faster rate with higher resolution. However, additional printing elements reduce the reliability of the system. If the probability of failure of each individual printing element is P and there are N printing elements, then the probability of zero nonfunctioning printing elements is $(1-P)^N$. Thus, the probability of all printing elements working properly decreases exponentially with the total number of printing elements. Hence, there is an increasing need for a fault-tolerant dot-matrix printing mode.

Some thermal ink jet printers, such as the Hewlett-Packard Desk Jet and Paint Jet printers, have a service station that restores printing elements having clogged nozzles. The service station primes the ink chambers of the printing elements and wipes the nozzle plate of the printhead to unclog the nozzles. If the service station clears a clogged nozzle, then that printing element can function normally. However, if the service station can not unclog the nozzle or if the nozzle is malfunctioning for some other reason, then the printing element will continue to malfunction and the printer will continue to produce inferior quality print. Most dot-matrix printers do not have any way of restoring malfunctioning printing elements.

SUMMARY OF THE INVENTION

A general goal of the invention is to maintain a high-level of print quality when one or more printing elements are inoperative.

Broadly stated, the invention is a fault-tolerant dot-matrix printing technique that substitutes a functioning printing element for a malfunctioning printing element. This is accomplished by the steps of testing the printhead to identify a malfunctioning printing element, choosing a substitute printing element to print for the malfunctioning printing element, disabling the malfunctioning printing element, rerouting the data intended for the malfunctioning printing element to the substitute printing element, and altering the scan path of the printhead in order that the substitute printing element prints data for the malfunctioning printing element as well as for itself.

Some embodiments of the invention divide the array of printing elements (often one or more columns oriented vertically with respect to the page) into equal sections and use a fully operative section to substitute for the sections containing malfunctioning printing elements. For example, the preferred embodiment of the invention divides the array of printing elements into two halves and replaces the half containing the malfunctioning printing elements with the other half. Other embodiments divide the array of printing elements into thirds, fourths, fifths, etc. The division may be either permanent or temporary.

Another embodiment divides the printing elements into one section that has the longest continuous strip of functioning printing elements and another section that contains the malfunctioning printing elements. Another embodiment divides the column of n printing elements into m equal sections such that m is the smallest factor of n for which at least one of the m sections does not contain any malfunctioning printing elements.

The advantage of fault-tolerant dot-matrix printing is that the printer produces high-quality print even when one or more of the printing elements are not functioning. In an extreme situation, the printer can deliver high-quality print when only one printing element is functioning. This capability gives users the option of replacing the malfunctioning printing element or the entire printhead at their convenience. If the printing element is part of a cartridge that incorporates the ink reservoir, users can delay replacement of the cartridge until it is convenient or until the ink is fully consumed.

BRIEF DESCRIPTION OF THE DRAWINGS

The Figures and Detailed Description when read together present a few specific narrow examples for practicing the claimed invention. However, the definition of the invention itself can only be determined by the Claims which have a scope so broad as to encompass many other examples.

FIG. 2a shows an array of twenty-four printing elements arranged in a vertical column with respect to the page.

FIG. 2b shows the scan path of the printhead shown in FIG. 2a when all the printing elements are operating properly.

FIG. 2c shows the preferred embodiment of fault-tolerant dot-matrix printing in which the printing elements are divided into two equal sections.

FIG. 2d shows the scan path of the printhead shown in FIG. 2c when operating in the fault-tolerant mode.

FIG. 3a shows an alternate embodiment of the invention in which the printing elements are divided into three equal sections.

FIG. 3b shows the scan path of the printhead shown in FIG. 3a when operating in the fault-tolerant mode.

FIG. 4a shows an alternate embodiment of the invention in which printing elements are divided into one section having the longest continuous strip of functioning printing elements and another section that contains the malfunctioning printing elements.

FIG. 4b shows the scan path of the printhead shown in FIG. 4a.

FIGS. 5a, 5b, and 5c show an alternate embodiment that divides the column of twenty-four printing elements into m sections, such that m equals the smallest factor of twenty-four for which at least one of the m sections does not contain any malfunctioning printing elements.

FIGS. 5d, 5e, and 5f show the scan paths of the printheads shown in FIG. 5a, 5b, and 5c when operating in the fault-tolerant mode.

DETAILED DESCRIPTION OF THE INVENTION

Figure 1:
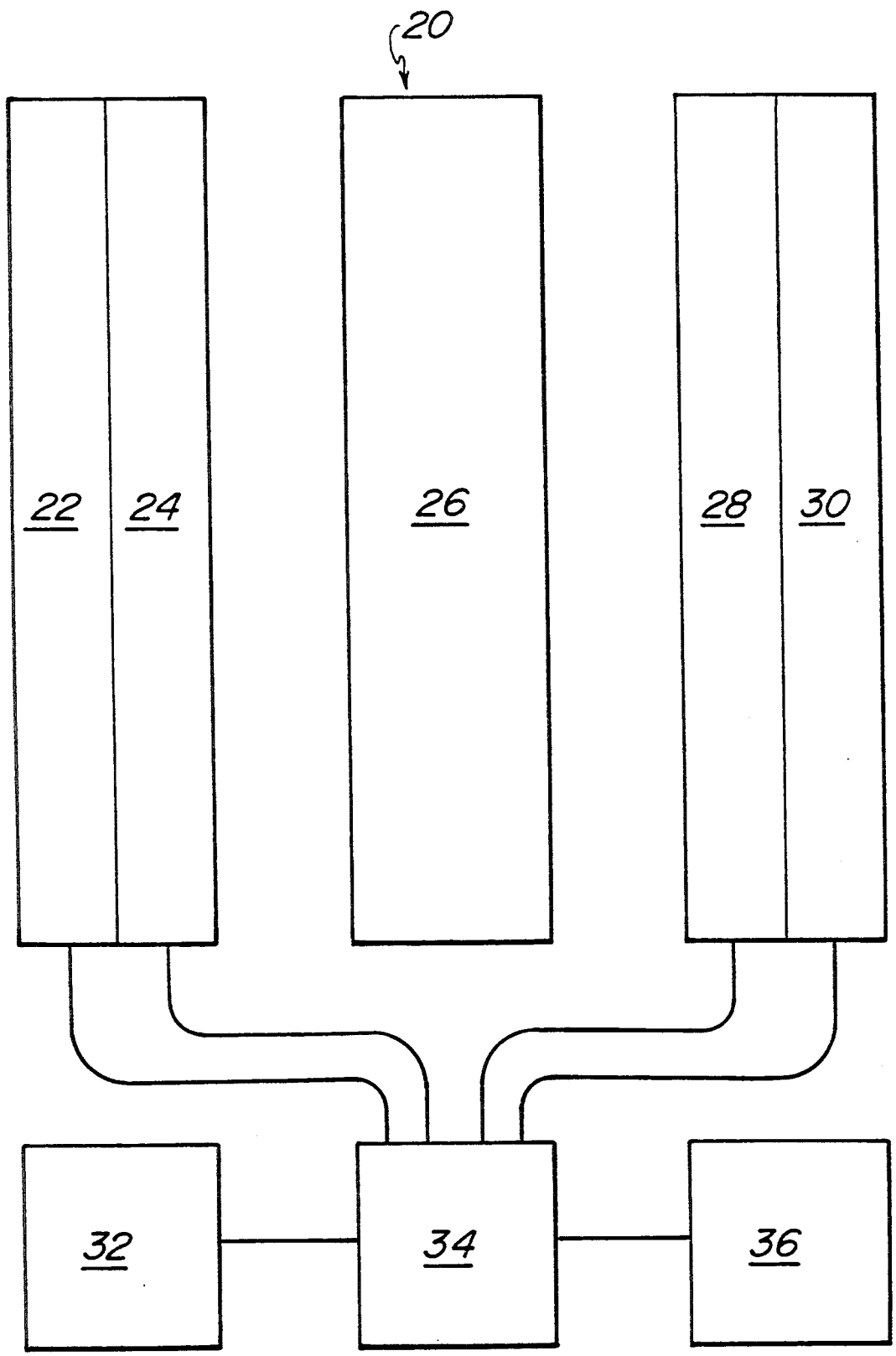
FIG. 1 shows a block diagram of a fault-tolerant dot-matrix printer.

The following paragraphs describe several specific examples of the invention which is more broadly defined by the claims. The invention is a fault-tolerant dot-matrix printing technique that substitutes functioning printing elements for malfunctioning printing elements to maintain print quality. In this context, the term "dot-matrix printing" refers to the printing of text and graphics using multiple printing elements to print a multitude of small dots near one another or superimposed upon one another to form an image. Although dots are often small round spots and dot-matrix printers usually print small round spots, the scope of the invention covers dots having any size and shape.

The fault-tolerant dot-matrix printing technique includes the steps of: testing the printhead for malfunctioning printing elements, choosing substitute printing elements to print in place of the malfunctioning printing elements, disconnecting the malfunctioning printing elements, rerouting print signals from the malfunctioning printing elements to the substitute printing elements, and altering the scan path (the course of the printhead down the page) to allow the substitute printing elements to print in place of the malfunctioning printing elements in addition to printing for themselves.

FIG. 1 shows one example of a fault-tolerant dot-matrix printer 20 made according to the present invention. The testing of the printing elements can be accomplished using a detector 28 which can be a piezoelectric membrane drop detector that sends out an electrical signal whenever a drop strikes it, an opto-electronic dot detector that measures the amount of light reflected from the paper, a person who examines a test pattern produced by the printer and types in the location of the malfunctioning printing element, or any other type of drop detector.

When printer 20 detects a malfunctioning printing element, it drops into the fault-tolerant mode and printer controller 34 executes the substitution algorithm that is stored in a memory 32. The substitution algorithm instructs printer 20 to choose a substitute printing element from an array of printing elements 26, disconnect the malfunctioning printing element, reroute data from the malfunctioning printing element to the substitute printing element, and alter the scan path of the printhead.

Printer controller 34 disconnects the malfunctioning printing element by not addressing it and reroutes data from it to the substitute printing element by changing the destination address of the data. A paper motion control device 24 and a printhead carriage 22 alter the scan path by decreasing the amount of paper that is advanced after each scan of the printhead across the page and by increasing the number of scans across the page respectively.

FIGS. 2a, 3a, 4a, 5a, 5b, and 5c show a typical printhead having a column of twenty-four printing elements (n=24). However, the invention is not restricted to this printhead configuration. In FIG. 2a, all 24 members of an array of printing elements 40 shown in FIG. 2a are properly functioning hence printer 20 is operating in the normal printing mode. The swath (the distance from the top of the usable printing elements to the bottom of the usable printing elements) plus the distance equal to the space between two printing elements is denoted by a distance 46. In FIG. 2b, a line 44 marks the scan path of array 40. FIGS. 2b, 2d, 3b, 4b, 5d, 5e, and 5f depict bidirectional scanning, but the invention will work equally well if unidirectional scanning is employed.

FIG. 2c shows the preferred embodiment of the invention, which is the inventor's best mode for practicing the claimed invention. An array of printing elements 54 is permanently divided into two halves 56, 58. Until detector 28 finds a malfunctioning printing element, the printer operates in the normal mode as illustrated by FIGS. 2a and 2b and treats array 54 as one unit instead of two halves.

When detector 28 finds a malfunctioning printing element, the printer drops into the fault-tolerant mode and determines whether the malfunctioning printing element is located in bottom half 58 or top half 56 of array 54. Since a malfunctioning printing element 48 is located in top half 56, the printer chooses defect-free bottom half 58 of the array of printing elements to substitute for the defective top half.

Printer controller 34 disconnects the top half by not addressing it and reroutes data from it to the bottom half. Since only one half of array 54 is used, swath 50 of the usable printing elements is one half of swath 46. This causes the printhead to make twice as many scans across the page as shown by a line 52 in FIG. 2d which is the scan path of defect-free bottom half 58.

If detector 28 finds another malfunctioning printing element in defective top half 56, the printer continues to produce flawless print. If the additional malfunctioning printing element appears in the previously defect-free bottom half 58, then the printer can either stop printing or print flawed type.

This embodiment is preferred because of its ease of implementation. In most applications, the malfunctioning printing element would be repaired or replaced before the second malfunctioning element would appear. For those applications in which perfect type is required at all times, or those in which the printing elements go unserviced for long intervals of time, one of the following embodiments may be more desirable.

THE EXAMPLE OF FIGURES 3a AND 3b

FIG. 3a shows an alternate embodiment of the invention in which an array of printing elements 76 is permanently divided into three equal sections 70, 72, 74. Until detector 28 finds a malfunctioning printing element, the printer operates in the normal mode as illustrated by FIGS. 2a and 2b and treats array 54 as one section instead of three. When detector 28 finds a malfunctioning printing element, the printer drops into the fault-tolerant mode and determines whether a malfunctioning printing element 68 is located in top-third section 70, middle-third section 72, or bottom-third section 74. Since malfunctioning printing element 68 is located in top-third section 70 in FIG. 3a, the printer in this example chooses either middle-third section 72 or bottom-third section 74 to substitute for top-third section 70.

Printer controller 34 disconnects top-third section 70 by not addressing it and reroutes data from it to the substitute section by giving it another destination address. Since one-third of printing elements 70 are disconnected, swath 80 of the remaining printing elements is two-thirds of swath 46 of the entire array and the printhead must make 50% more scans across the page. A line 78 shows the scan path of the usable printing elements.

If detector 28 finds a second malfunctioning printing element 84, the printer determines whether it is located in the same section as malfunctioning printing element 68. If it is located in the same section, then the printer does not alter its present operation.

If the newly discovered malfunctioning printing element 84 is located in a different section, such as middle-third section 72, then the printer chooses bottom-third section 74 to substitute for top-third section 70 and middle-third section 72. Printer controller 34 stops addressing middle-third section 72 and reroutes print signals from it and top-third section 70 to bottom-third section 74. Since two sections 72, 74 are disconnected, swath 86 of the remaining printing elements is one-third of swath 46 of the entire array and one-half of swath 80. The printer must alter the scan path of the printhead from that shown by line 78 to that shown by a line 82.

Further alternate embodiments of the invention include printing elements that are permanently divided into four, five, six, etc. sections. These alternate embodiments would operate in the same manner as the previously discussed embodiments that divide the printing elements into halves or thirds.

THE EXAMPLE OF FIG. 4a AND 4b

FIG. 4a shows an alternate embodiment of the invention that divides an array of printing elements 98 into the "longest defect-free section" 94 that has the longest continuous section of functioning printing elements and a "defective section" 92 that contains one or more malfunctioning printing elements 90.

Before detector 28 finds any malfunctioning printing elements, the printer operates in the normal mode as illustrated by FIGS. 2a and 2b. Upon discovery of malfunctioning printing element 90, the printer drops into the fault-tolerant printing mode and searches for the longest defect-free section 94. When this section is found, printer controller 34 stops addressing defective section 92 that contains malfunctioning printing element 90 and reroutes printing signals from defective section 92 to longest defect-free section 94.

Next, the printer alters the scan path of the printing elements so that longest defect-free section 94 can print for itself as well as for defective section 92. Swath 102 of longest defect-free section 94 is shorter than swath 46 of the entire array of printing elements. Accordingly, array of printing elements 98 must make more scans across the page as shown in FIG. 4b by a line 96 which represents the scan path of longest defect-free section 94.

THE EXAMPLES OF FIGS. 5a-5f

If detector 28 can determine the location of a malfunctioning printing element, printer controller 34 divides the columns of n printing elements into m equal sections such that m is the smallest factor of n for which at least one of the sections does not contain a malfunctioning printing element. Since the printheads in FIGS. 2a, 2c, 3a, 4a, 5a, 5b, and 5c have 24 printing elements in one column (n=24), they can be divided into either two, three, four, six, eight, twelve, or twenty-four sections. Printer controller 34 disconnects the sections containing the malfunctioning printing elements and reroutes printing signals from these sections to the substitute sections that contain functioning printing elements.

FIGS. 5a-5f illustrate an example of the invention to be used when detector 28 can detect but can not locate the malfunctioning printing element. Until detector 28 detects the existence of a malfunctioning printing element 112, an array of printing elements 110 shown in FIG. 5a is not divided into sections and the printer operates in the normal mode with the normal swath 46 as illustrated by FIGS. 2a and 2b.

When detector 28 discovers malfunctioning printing element 112, the printer drops into the fault-tolerant mode and divides array 110 into m sections, where m equals the lowest factor of the number of printing elements in a column, which in the case of FIG. 5a, is two. This division creates sections 114, 118 shown in FIG. 5a. Next, printer controller 34 instructs detector 28 to determine whether both sections 114, 118 have malfunctioning printing elements. Since section 114 is free of malfunctioning printing elements, printer controller 34 disconnects defective section 118 which contains malfunctioning printing element 112 and reroutes its print data to defect-free section 114. This section has a swath 119 and the scan path of the printing elements is altered from that shown in FIG. 2b by a line 44 to that shown in FIG. 5d by a line 116.

If both sections 114, 118 contain malfunctioning printing elements, then the printer divides the printing elements into three sections 120, 122, 124, as shown in FIG. 5b, because three is the next lowest factor of the number of printing elements in one column. Next, detector 28 determines whether all three sections 120, 122, 124 have a malfunctioning printing element. If one section is free of malfunctioning printing elements, such as section 124, then printer controller 34 proceeds with the steps of disconnecting defective sections 120, 122 which contain malfunctioning printing elements 130, 131 and rerouting their print data to section 124. Next, print controller 34 alters the scan path of the array of printing elements 128 so that it resembles scan path 126 shown in FIG. 5e.

If all three sections 120, 122, 124 have malfunctioning printing elements, then printer controller 34 uses the next lowest factor, which is four, and divides the printing elements into four sections 142, 144, 146, 148, as shown by FIG. 5c. Since one f these sections is free of malfunctioning printing elements, printer controller 34 proceeds with the steps of disconnecting sections 142, 144, 148 that contain malfunctioning printing elements 143, 145, 147, rerouting the print signals, and altering the scan path, as described above.

If all four sections have a malfunctioning printing element, then printer controller 34 divides the printing elements into the number of sections that equals the next lowest factor of 24, which is six. This process is repeated until the printer obtains a section of printing elements that is free of malfunctioning printing elements. In extreme situations, the printing elements may be divided into 24 sections each containing one printing element.

When there are malfunctioning printing elements, fault tolerant dot-matrix printing techniques deliver high-quality print at the expense of speed. As shown by the drawings, the fault-tolerant mode requires the printhead to make extra scans across the page as it travels down the page. This reduces the print speed, but users consider this tradeoff between print quality and speed desirable because they can replace the malfunctioning printing element when it is convenient for them and meanwhile receive high-quality print.

A printer may have a fault-tolerant mode in addition to other schemes that repair particular defects of the printing elements such as a service station or a scheme that varies the power delivered to a printing element. The service station scheme, which can be used in ink-jet printers, tests the printing elements and sends the printhead to the service station if the detector finds a malfunctioning nozzle. The service station primes the ink chambers of the nozzles and wipes the nozzle plate of the printhead. The nozzles are tested again and if any nozzle is still malfunctioning, the fault-tolerant printing mode is utilized to maintain high-quality print. The scheme that varies the power delivered to malfunctioning printing elements tests the printhead for malfunctioning printing elements and then either drives the printing elements that are printing too large of a dot with less power or drives the printing elements that are printing too small of a dot with more power.

The claims define the invention. Therefore, the foregoing Figures and Detailed Description show only a few examples of the systems possible according to the claimed invention. The exact implementation of this invention depends on the arrangement of printing elements on the printhead and the scope of this invention includes not only the embodiments described herein for a single column of 24 elements but includes embodiments for all configurations of printing elements. The described embodiments can be modified and new embodiments may be created without departing from the scope of the invention which is defined by the claims.

The invention claimed is:

1. A method for fault-tolerant dot matrix printing for dot matrix printers having a printhead that moves along a scan path, comprising the steps of:
   a. testing a plurality of printing elements to locate a malfunctioning printing element;
   b. identifying a defective section of the printing elements that contains more than one printing element including at least one malfunctioning printing element;
   c. choosing a defect-free section that contains a plurality of functioning printing elements to print for the defective section as well as for the defect-free section;
   c. disconnecting the defective section;
   e. rerouting the print signals from the defective section to the defect-free section of printing elements; and
   f. altering the scan path of the printhead so the defect-free section of printing elements prints for the defective section as well as for the defect-free section.

2. A method, as in claim 1, wherein, the printhead includes a top-half section and a bottom half section of printing elements, the steps identifying a defective section, choosing a defect-free section, and altering the scan path, further comprise:
   a. determining a defective half section by determining whether a defective printing element is located in the top-half section or in the bottom-half section of the printing elements, the half section containing the defective printing element being the defective half section;
   b. substituting the defect-free half section for the defective half section;
   c. disconnecting the defective half section;
   d. reducing the amount of paper advanced by the printer for each carriage return by one-half the swath used in a normal mode; and
   e. printing only one-half of each character cell with each scan of a printhead across the page.

3. A method as in claim 1, wherein the printhead includes a top-third, middle-third and bottom-third section of printing elements, the steps identifying a defective section, choosing a defect-free section, and altering the scan path, further comprise;
   a. a determining whether the defective printing element is located in the top-third, middle-third, or bottom-third section of the printing elements;
   b. choosing a defect-free one-third section to substitute for the defective one-third section that contains the malfunctioning printing element;
   c. disconnecting the defective one-third section;
   d. rerouting the print signals from the defective one-third section to the defect-free one-third section; and
   e. altering the scan path to allow the defect-free one-third section to print for the defective one-third section as well as for the defect-free one-third section.

4. A method as in claim 1, wherein the steps identifying a defective section, choosing a defect-free section, and altering the scan path, further comprise:
   a. identifying a defective section that contains more than one printing element including at least one malfunctioning printing element;
   b. identifying a longest defect-free section;
   c. disconnecting the defective section;
   d. rerouting the print signals from the defective section to the longest defect-free section; and
   e. altering the scan path to allow the longest defect-free section to print for the defective section as well as for the defect-free section.

5. A method as in claim 4, wherein altering the scan path further comprises:
   a. setting a swath equal to the length of the longest defect-free section; and
   b. advancing the paper by an amount equal to the swath of the longest defect-free section.

6. A method as in claim 1, further comprising the steps of:
   a. printing an entire page;
   b. testing the printing elements;
   c. replacing the malfunctioning printing elements; and
   d. reprinting the entire page if any printing element was replaced.

7. An apparatus for fault-tolerant dot-matrix printing, for dot matrix printers having a printhead that moves along a scan path, comprising:
   a. a dot-matrix printhead having a plurality of printing elements;
   b. a means for testing the printing elements for a malfunctioning printing element;
   c. a means for dividing the printing elements into two or more sections where at least one section is a defective section containing more than one printing element, including at least one malfunctioning printing element, and where at least one section is a defect-free section containing a plurality of printing elements;
   d. a means for turning-off the defective section;
   e. a means for rerouting data from the defective section to the defect-free section; and g. a means for altering the scan path of the printhead across a page so that the defect-free section can print for the defective section as well as for the defect-free section.

8. An apparatus as in claim 7, wherein:
a. the dot-matrix printer is an ink jet printer; and
b. the means for testing the printing elements is a drop detector.

* * * * *